(No Model.)  2 Sheets—Sheet 1.
H. E. DEPP.
VALVE GEAR.
No. 278,689. Patented June 5, 1883.
Fig 1.
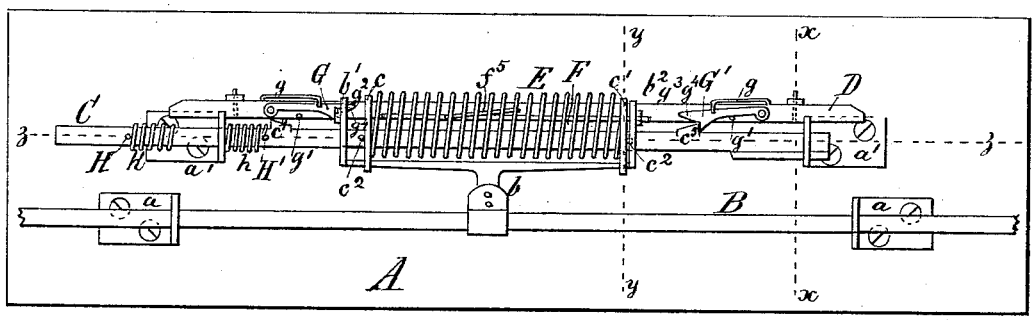
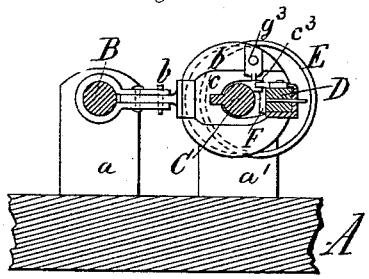
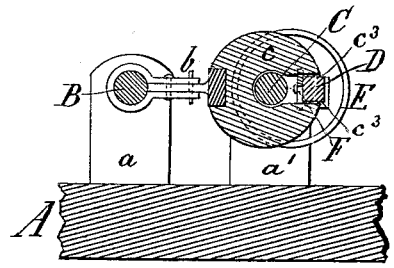
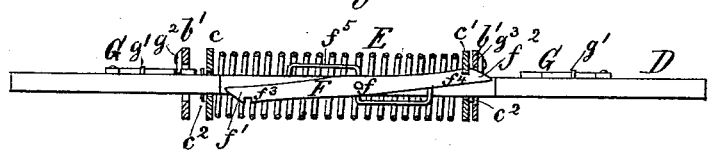
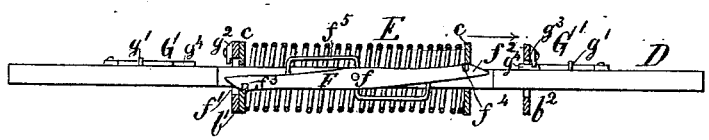
Witnesses:
J. P. Theo. Lang.
Robt. L. Fenwick.
Inventor:
Hezekiah E. Depp
by his attys
Fenwick Lawrence (No Model.) 2 Sheets—Sheet 2.

H. E. DEPP.
VALVE GEAR.

No. 278,689. Patented June 5, 1883.

UNITED STATES PATENT OFFICE.

HEZEKIAH E. DEPP, OF SEDALIA, MISSOURI.

VALVE-GEAR.

SPECIFICATION forming part of Letters Patent No. 278,689, dated June 5, 1883.

Application filed May 2, 1882. Renewed February 12, 1883. (No model.)

*To all whom it may concern:*

Be it known that I, HEZEKIAH E. DEPP, a citizen of the United States, residing at Sedalia, in the county of Pettis and State of Missouri, have invented a new and useful Improvement in Valve-Gear, of which the following is a specification.

My invention relates to improvements in valve-motions in which a spring contrivance is used for moving the steam or other sliding valve just after the piston of the steam-cylinder has finished its stroke; and the special features of my invention are, first, a device in which a single spiral spring is compressed forward and backward alternately for the purpose of operating the slide-valve by its expansion following each compression; second, the means by which the said spiral valve-operating spring is compressed and allowed to expand in accordance with the movements of the piston-rod.

The objects of my invention are, first, to secure an equal power both for the forward and the backward movement of the valve; second, to make the valve-strokes altogether independent of the piston-rod strokes. I attain these objects by the mechanism illustrated in the accompanying drawings, in which—

Figure 6:
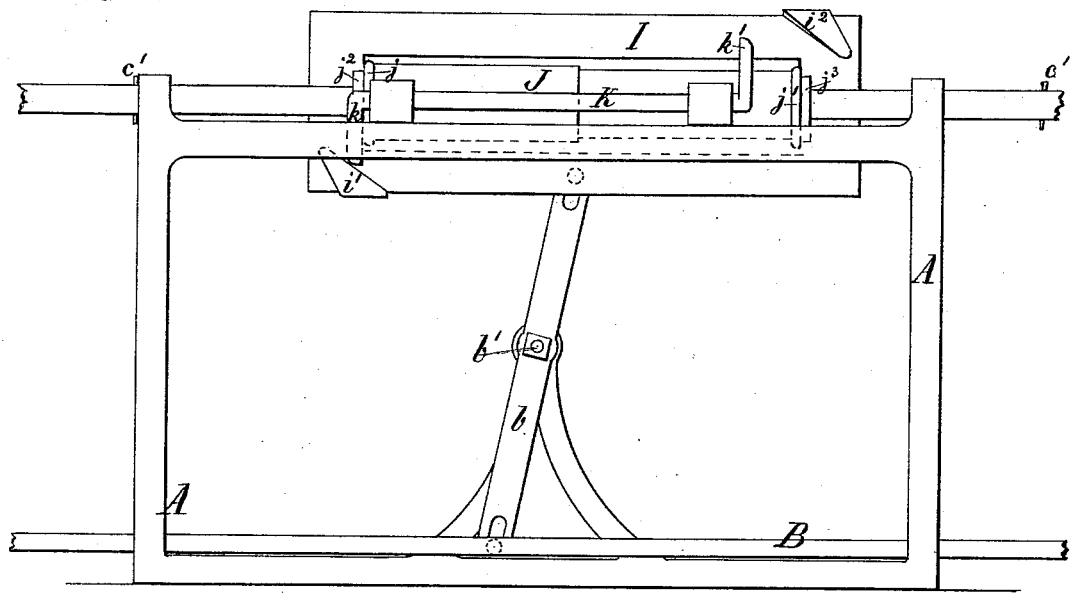
Figure 7:
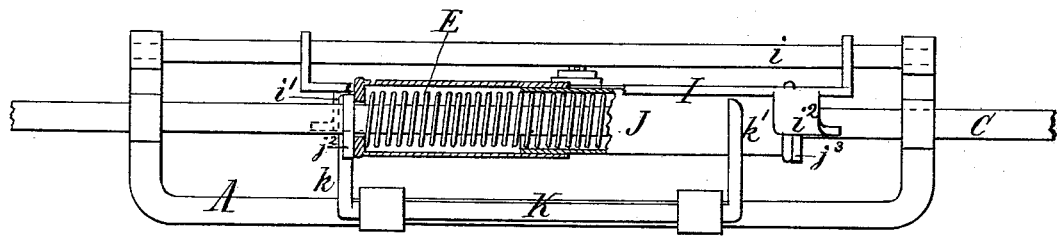
Figure 8:
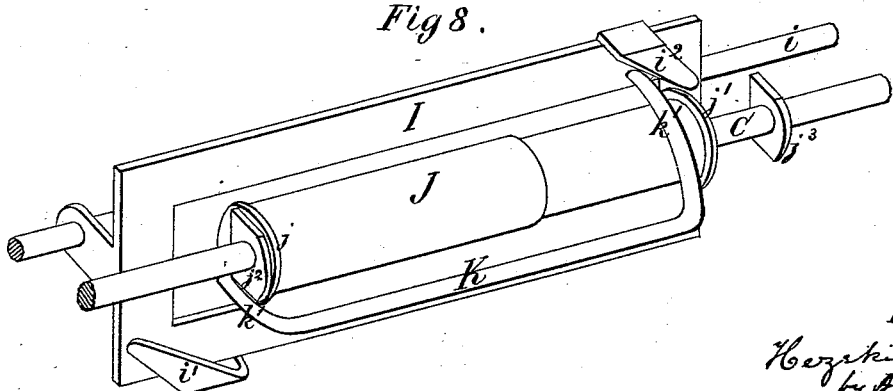

Figure 1 is a plan view of my improved valve-motion. Fig. 2 is an enlarged cross-section in the line $x\ x$ of Fig. 1. Fig. 3 is an enlarged cross-section in the line $y\ y$ of Fig. 1. Fig. 4 is a longitudinal section in the line $z\ z$ of Fig. 1. Fig. 5 is a section similar to Fig. 4, but showing the spiral spring compressed and in the act of reversing the valve-stroke. Fig. 6 is an elevation of a modified construction of my valve-motion. Fig. 7 is a plan view of the same, certain portions of it being broken away in order to expose the spiral spring to view; and Fig. 8 is a diagram of the main portions of the valve-motion, whereby the spiral spring is operated.

Similar letters refer to similar parts throughout the several views.

In Figs. 1, 2, and 3, A represents a suitable support on the frame of a steam-engine cylinder. On this support A suitable bearings, $a\ a'$, are provided, through which the piston-rod B and valve-rod C are passed.

Opposite the valve-rod C a bar, D, is suitably fastened to the bearings $a'$, and upon this bar the pawls of the valve-motion are fastened, as will be seen.

The piston-rod B is provided with a forked tappet, $b$, having plates $b'\ b^2$, through which the valve-rod C and bar D pass.

Between the plates $b'\ b^2$ two plates, $c\ c'$, are provided on the valve-rod C at a suitable distance apart, and between those plates, and over the valve-rod C and the bar D, a spiral spring, E, is confined, so as to bear against the said plates $c\ c'$, which are loosely fitted upon the rod C, and held at a proper distance apart by means of pins $c^2$. The plates $c\ c'$ extend over the bar D by means of slots $c^3$, (see Fig. 3,) so as to be capable of freely traveling over the said bar, and operating alternately the notched inclined end of a double-armed lever, F, pivoted at $f$ to the bar D. The inclined ends $f'\ f^2$ of the lever F and the notches $f^3\ f^4$ of the lever F stand in opposite directions—viz., $f'\ f^3$ downward and $f^2\ f^4$ upward—and the lever F is, by means of a spring, $f^5$, in the bar D, held in a normal position, so that the bottoms of the notches $f^3\ f^4$ stand in line with the respective sides of the slots $c^3$ in the plates $c\ c'$. Thus when the plate $c$ moves over the inclination $f'$ the lever F is moved out of its normal position, as seen in Fig. 5, and as soon as the said plate $c$ stands opposite the notch $f^3$ the spring $f^5$ moves the lever D into its normal position and locks the plate $c$ by moving the notch $f^3$ over it. The same operation takes place in alternate succession with the other plate $c'$ and the parts $f^2\ f^4$. The length of the lever F is less than the distance between the plates $b'\ b^2$ when said plates stand in their normal position against the stop-pins $c^2$, and this difference of length is a little greater than the extent of the valve-stroke.

The valve-rod C is provided with two projections, $c^4\ c^5$, which are in form of ratchet-teeth and slant inwardly in opposite directions. These projections extend toward the bar D, upon which two spring-pawls, G G', are provided at a distance apart greater than the distance between the ratchet-teeth $c^4\ c^5$, the difference between the length of these distances being equal to the length of the valve-stroke. These spring-pawls G G' are kept in their normal position by means of springs $g$ and stops $g' g'$, and they are disengaged by means of fingers $g^2 g^3$ on the plates $b' b^2$.

The valve-rod C is provided with stopping-pins H H' and bumper-springs $h h'$, and by means of these pins the valve-stroke is limited while the springs receive the shock or concussion.

In Fig. 1 the tappet $b$ is represented as just having finished its forward stroke, the plate $c'$ being locked by the lever F, and the valve-rod C being locked by the ratchet-tooth $c^5$ and spring-pawl G'. The return-stroke of the piston-rod brings the plate $b'$ in contact with the plate $c$, which plate is then pushed toward the plate $c'$, and finally over the inclined end $f'$ of the lever F into the slot $f^3$, when the spring $f^5$ causes the lever F to lock the plate $c$. Just before the plate $c'$ moves over the slot $f^3$ the lever F is so moved out of its normal position that the plate $c'$ becomes disengaged from the slot $f^4$, and bears against a pin, $c^2$, of the still-locked valve-rod C. This valve-rod C becomes disengaged from the spring-pawl G' by means of the finger $g^3$ on the plate $b^2$, which finger moves against the inclined end $g^4$ of the pawl G' and swings the same away from the retaining ratchet-tooth $c^5$ immediately after the plate $c'$ has arrived at the pin $c^2$, and thus sets the valve-rod free. The valve-rod is thereupon pushed backward by the spring E until its progress is arrested by the spring $h$. The same operation is repeated on the other end of the valve-motion on the return-stroke of the piston.

In Figs. 6, 7, and 8 the piston-rod B operates an oblong frame, I, sliding upon a stationary rod, $i$. An expansible or telescope housing, J, incloses the spring E on the valve-rod C, and the ends $j j'$ of the housing bear against two collars, $j^2 j^3$, on the valve-rod C, and extend into the inner open portion of the frame I. A two-armed shaft, K, suitably hung to the main frame A, serves to check alternately the progress of the ends $j j'$ of the housing J. The arm $k$ of this shaft extends below the housing J, and the arm $k'$ over the said housing, the distance between the two arms being less than the distance between the collars $j^2 j^3$. The difference in the distances mentioned is equal to the stroke of the valve, and the stroke of the valve-rod is terminated by the stopping-pins $c c'$ and the bearings of the valve-rod in the frame A.

The frame I is provided with an upper cam, $i^2$, opposite the upper arm, $k'$, and a lower cam, $i'$, opposite the lower arm, $k$. The cams $i' i^2$ are so located with reference to the arms $k k'$ that only one will operate at the same time upon an arm.

The piston-rod B is connected with the frame I by means of a lever, $b$, suitably pivoted at $b'$ to a portion of the frame A, and as the frame I is thus moved forward and backward the housing J is alternately compressed from one or the other side, and held by either the arm $k$ or $k'$, as the case may be. While the compression of the housing is taking place at one end—say $j'$—the other end, $j$, is held by the arm $k$, and kept from moving in the direction of the end $j'$; but as the end $j'$ approaches the termination of its stroke the cam $i^2$, by means of its inclined lower surface, depresses the arm $k'$ until the arm $k$ is thereby moved out of range of the end $j$. The end $j$, thus liberated, is moved by the spring E away from the end $j'$, and as soon as the stroke of the valve is finished the arm $k'$ is depressed sufficiently to descend behind the end $j'$, and thus prevent it from moving backward with the back stroke of the frame I.

The operation for the back stroke is similar to that of the forward stroke, and does not require special description.

What I claim as my invention, and desire to secure by Letters Patent, is—

1. In combination with a valve and a piston movement, the single spring E, provided with means for alternately effecting the compression and expansion of the same during each full stroke of the piston, substantially as and for the purpose described.

2. The combination of the rods B and C, bar D, spring E, plates $c c'$, tappet $b$, fingers $g^2 g^3$, ratchet-teeth $c^4 c^5$, and spring-pawls G G', substantially as and for the purpose described.

3. The combination of the spring $f^5$, notched lever F, and plates $c c'$, substantially as and for the purpose described.

4. The tappet $b$, provided with the fingers $g^2 g^3$, in combination with the spring E and means by which the single spring is brought into action, substantially as and for the purpose described.

5. The rod C, provided with the ratchet-teeth projections $c^4 c^5$, in combination with the spring-pawls G' G', spring E and means by which the single spring is brought into action, substantially as and for the purpose described.

6. The lever F, with bevels $f' f^2$, and notches or slots $f^3 f^4$, in combination with the spring E and means whereby the single spring is brought into action, substantially as and for the purpose described.

7. The combination of the piston-rod B, rod C, spring E, and bumper-springs H H', substantially as and for the purpose described.

8. The forked tappet $b$ for operating the plates $c c'$, and thereby compressing the spring E in opposite directions, substantially as and for the purpose described.

HEZEKIAH E. DEPP.

Witnesses:
S. M. TRUMBULL,
J. E. RITCHEY.